(12) United States Patent
Anguiano

(10) Patent No.: US 12,130,880 B2
(45) Date of Patent: *Oct. 29, 2024

(54) APPARATUS, SYSTEMS AND METHODS FOR CONTENT PLAYLIST BASED ON USER LOCATION

(71) Applicant: DISH Technologies L.L.C., Englewood, CO (US)

(72) Inventor: Jason Anguiano, Castle Rock, CO (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/316,978

(22) Filed: May 12, 2023

(65) Prior Publication Data
US 2023/0289394 A1  Sep. 14, 2023

Related U.S. Application Data

(63) Continuation of application No. 17/847,458, filed on Jun. 23, 2022, now Pat. No. 11,663,283, which is a continuation of application No. 17/157,831, filed on Jan. 25, 2021, now Pat. No. 11,403,359, which is a continuation of application No. 16/451,931, filed on Jun. 25, 2019, now Pat. No. 10,909,201, which is a continuation of application No. 15/858,478, filed on Dec. 29, 2017, now Pat. No. 10,339,194, which is a continuation of application No. 14/629,769, filed on Feb. 24, 2015, now Pat. No. 9,858,346.

(51) Int. Cl.
 G06F 16/9537 (2019.01)

(52) U.S. Cl.
 CPC .............. *G06F 16/9537* (2019.01)

(58) Field of Classification Search
 CPC ................................. G06F 16/9537
 See application file for complete search history.

(56) References Cited

U.S. PATENT DOCUMENTS

| 8,719,231 B2* | 5/2014 | Jotanovic | G06F 16/687 |
| | | | 707/899 |
| 9,510,036 B1 | 11/2016 | Lewis | |
| 10,587,667 B2* | 3/2020 | Stridsman | H04N 21/26258 |

(Continued)

*Primary Examiner* — Jorge A Casanova
(74) *Attorney, Agent, or Firm* — Perkins Coie LLP

(57) ABSTRACT

An exemplary geographic playlist system includes a plurality of mobile devices with global positioning systems that provide geographic location information of the mobile device to a geographic location playlist device. The geographic location playlist device has a database of geographic playlist information that includes at least a unique identifier for each one of a plurality of media content events and at least one associated geographic location for each of the plurality of media content events. The geographic location playlist device determines a current geographic location of the mobile device, compares the geographic location of the mobile device with the geographic locations residing in the database, and generates user geographic playlist information that includes the identifier of media content events that has an associated geographic location that matches with the determined geographic location of the mobile device. A geographic playlist is then presented to the user of the mobile device.

20 Claims, 5 Drawing Sheets

(56) References Cited

U.S. PATENT DOCUMENTS

| | | |
|---|---|---|
| 2003/0135513 A1 | 7/2003 | Quinn et al. |
| 2007/0060112 A1 | 3/2007 | Reimer |
| 2007/0282526 A1 | 12/2007 | Smith |
| 2009/0094257 A1 | 4/2009 | Nissen |
| 2009/0328087 A1 | 12/2009 | Higgins et al. |
| 2010/0071007 A1 | 3/2010 | Meijer |
| 2010/0088023 A1 | 4/2010 | Werner |
| 2011/0283322 A1 | 11/2011 | Hamano |
| 2012/0015778 A1 | 1/2012 | Lee et al. |
| 2012/0290653 A1 | 11/2012 | Sharkey |
| 2013/0346240 A1* | 12/2013 | Roberts ............... H04W 4/024 455/456.3 |
| 2014/0281971 A1 | 9/2014 | Isbell, III et al. |
| 2019/0317975 A1 | 10/2019 | Anguiano |
| 2021/0149978 A1 | 5/2021 | Anguiano |
| 2022/0327177 A1 | 10/2022 | Anguiano |

* cited by examiner

FIG. 4
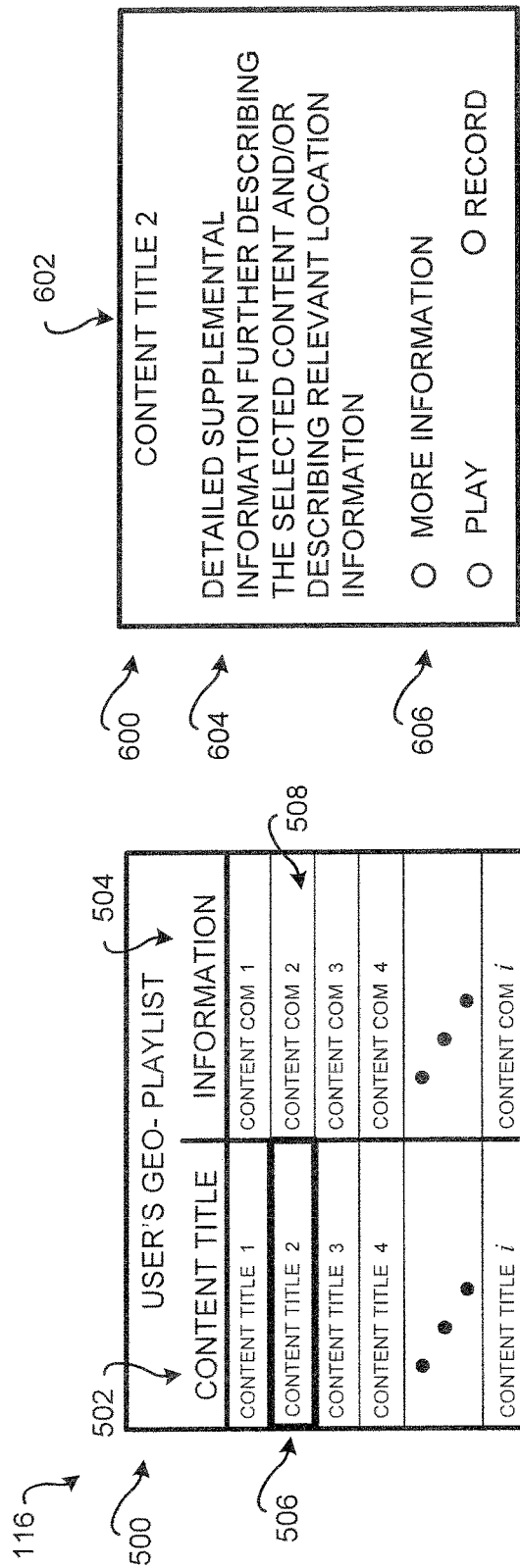
FIG. 6
FIG. 5

APPARATUS, SYSTEMS AND METHODS FOR CONTENT PLAYLIST BASED ON USER LOCATION

APPLICATION PRIORITY

This patent application is a Continuation of U.S. Non-Provisional patent application Ser. No. 17/847,458, filed Jun. 23, 2022, entitled "APPARATUS, SYSTEMS AND METHODS FOR CONTENT PLAYLIST BASED ON USER LOCATION," which is a Continuation of U.S. Non-Provisional patent application Ser. No. 17/157,831, filed Jan. 25, 2021, entitled "APPARATUS, SYSTEMS AND METHODS FOR CONTENT PLAYLIST BASED ON USER LOCATION," which is a Continuation of U.S. Non-Provisional patent application Ser. No. 16/451,931, filed Jun. 25, 2019, entitled "APPARATUS, SYSTEMS AND METHODS FOR CONTENT PLAYLIST BASED ON USER LOCATION," which is Continuation of U.S. Non-Provisional patent application Ser. No. 15/858,478, filed Dec. 29, 2017, entitled "APPARATUS, SYSTEMS AND METHODS FOR CONTENT PLAYLIST BASED ON USER LOCATION," and issued as U.S. Pat. No. 10,339,194 on Jul. 2, 2019, which is a Continuation of U.S. Non-Provisional application Ser. No. 14/629,769, filed Feb. 24, 2015, entitled "APPARATUS, SYSTEMS AND METHODS FOR CONTENT PLAYLIST BASED ON USER LOCATION," and issued as U.S. Pat. No. 9,858,346 on Jan. 2, 2018, the content of which are herein incorporated by reference in their entirety.

BACKGROUND

When travelling, a user may be interested in accessing content that relates to a location that the user is currently at, has recently been to, or may be at in the immediate future. However, the process of "finding" relevant content when the user conducts a manual search of various content sources may be time consuming, potentially unproductive, and unreliable. That is, available search engines that the user might access during their travels to conduct a content search could provide incomplete content information and/or content information that is not relevant and/or that is not of interest to the user. Further, the time required for the user to conduct a search for content may be significant, and may otherwise detract from the process of travelling.

Accordingly, there is a need in the arts to permit a user to identify content that may be of interest to a geographic location in which they are currently travelling. Further, there is a need to provide convenient access to such identified content on a timely basis.

SUMMARY

Systems and methods of presenting a geographic playlist that identifies media content events which are associated with a location of a mobile device are disclosed. An exemplary geographic playlist system includes a plurality of mobile devices with global positioning systems that provide geographic location information of the mobile device to a geographic location playlist device. The geographic location playlist device has a database of geographic playlist information that includes at least a unique identifier for each one of a plurality of media content events and at least one associated geographic location for each of the plurality of media content events. The geographic location playlist device determines a current geographic location of the mobile device, compares the geographic location of the mobile device with the geographic locations residing in the database, and generates user geographic playlist information that includes the identifier of media content events that has an associated geographic location that matches with the determined geographic location of the mobile device. A geographic playlist is then presented to the user of the mobile device.

BRIEF DESCRIPTION OF THE DRAWINGS

Preferred and alternative embodiments are described in detail below with reference to the following drawings:

FIG. 4 conceptually illustrates an example format of a database used for an exemplary geographic playlist information;

FIG. 5 is an illustration of an embodiment of a user geographic playlist;

FIG. 6 is an illustration of an example embodiment of a graphical user interface (GUI) that is presented on the display in response to a user's selection of one of the listed media content events (or portions thereof)

DETAILED DESCRIPTION

Figure 1:
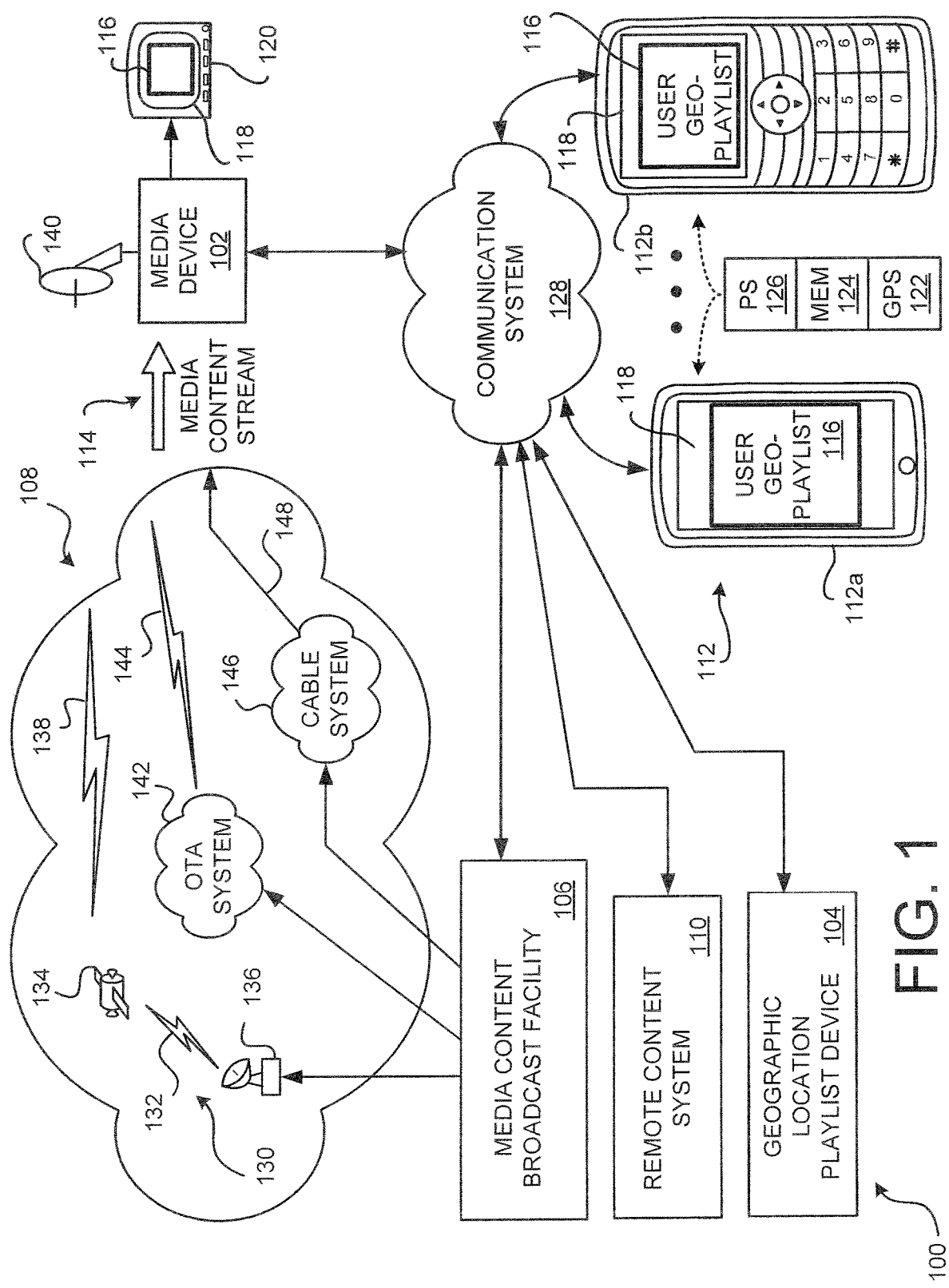
FIG. 1 is a block diagram of an embodiment of a geographic location playlist generation system.

FIG. 1 is a block diagram of an embodiment of a geographic location playlist generation system 100. The exemplary embodiment of the geographic location playlist generation system 100 is implemented in an exemplary environment that comprises a media device 102, a geographic location playlist device 104, a media content broadcast facility 106, a broadcast system 108, a remote content system 110, and a plurality of mobile devices 112. The media device 102 receives a media content stream 114 provided from the media content broadcast facility 106 over the broadcast system 108. The media content stream 114 is provided by a media content service provider. Other environments may include fewer elements that the elements illustrated in FIG. 1 and/or may include other elements (not shown).

Embodiments of the geographic location playlist generation system 100 receive geographic location information from one of the mobile devices 112. The geographic location information indicates a current geographic location, an anticipated or expected future geographic location, or a previous geographic location, of that particular mobile device 112. Preferably, the geographic location information is defined or provided in a suitable coordinate system, such as a latitude value and a longitude value. Any suitable coordinate system may be used. Alternatively, or additionally, the geographic location information may be provided as an address, city, known reference point (such as a historical landmark, well known landmark, or the like) or the like. Some embodiments may convert such alternative geographic location information into latitude and longitude values.

Based on the received geographic location information, embodiments of the geographic location playlist generation system 100 identify at least one media content event that pertains to the received geographic location information. In an example embodiment, a user geographic playlist (geoplaylist) 116 is generated and is communicated to the media device 102 and/or the mobile devices 112 for presentation on a display 118. For example, the media device 102 is communicatively coupled to a television 120 (TV) such that the user geographic playlist 116 is presented on the display 118 of the TV 120. Alternatively, or additionally, the user geographic playlist 116 may be presented on the display 118 of the example note pad 112a (tablet 112a) or the example smart phone 112b. The user geographic playlist 116 lists identifiers of a plurality of media content events or identifier and identifiers of a plurality of media content event portions that are in proximity to the determined location of the mobile device 112.

In practice, the current geographic location information is provided by an onboard global positioning system (GPS) component 122, a memory 124, and a processor system (PS) 126 residing within the mobile device 112. Alternatively, or additionally, the geographic location information may be manually specified by the user or may be provided by another device (not shown). For example, the user of the mobile device 112 may manually (or verbally) specify an address that they are interested in, that they expect to be at in the future, or that they have previously been at.

Some media content events can be segmented into portions. For example, a news program may be segmented in to a plurality of serially presented portions, where each portion has a unique theme or topic. As another example, a travel show may be segmented into a plurality of serially presented portions, where each portion relates to a different location and/or different attraction of interest. As yet another example, movie or serial program may be segmented into a plurality of serially presented scenes (portions), where each scene has been filmed at a different location and/or relates to a theme. Such segments or portions of a media content event may be interchangeably referred to herein as a media content event. Accordingly, media content events that are identified to the user based on geographic locations may be a segment or portion of a whole media content event. Here, the segment or portions of such media content events include information that identifies various characteristics of that segment or portion such that an association with at least one geographic location can be made. Alternatively, or additionally, the media content event portion has had predefined geographic location information associated with that segment or portion. As used herein, a segment may be interchangeably referred to herein as a portion of a media content event.

In some embodiments, the user geographic playlist 116 may be configured to permit selection of a particular media content event or a relevant segment or portion of a media content event that is listed on a presented user geographic playlist 116. For example, the user may be at, or may have recently been at, a particular geographic location that is related to a scene in a movie or a segment of a travel program. Access to the movie, the movie scene, and/or the travel program segment may be of interest to the user. The user may wish to view and/or listen to the media content event (or portion thereof) using their mobile device 112 while at the location, and/or may be interested in later viewing and/or listening to the media content event (or portion thereof) listed on the user geographic playlist 116.

Some embodiments may be configured to allow the user to select one or more of the listed media content events (or portions thereof) shown on the user geographic playlist 116. In response to a user selection of a particular media content event (or portion thereof) that is listed (shown) on the user geographic playlist 116, the selected media content event (or portion thereof) is accessed from the remote content system 110 or other suitable source of content, and is presented to the user. For example, a selected media content event (or portion thereof) may be accessed from the remote content system 110 via the communication system 128 and/or the broadcast system 108. The user may then view and/or listen to the presented media content event (or portion thereof).

In practice, the user geographic playlist 116 may be presented to the user as they are moving about or are at a particular location. For example, the user may be a tourist in a foreign city. While at a particular location, the user geographic playlist 116 may indicate a plurality of different geographic-related media content events, such as, but not limited to, movies (or portions thereof), programs (or portions thereof), news cast segments (or portions thereof), or the like that are associated with the user's location. The user may wish to select one or more of the listed media content events (or portions thereof) for immediate viewing and/or for later viewing, such as when they return to their hotel.

For example, the user may be interested in visiting film set locations where their favorite movie or serial program has been filmed in the foreign city that they are visiting. The user geographic playlist 116 may list a plurality of movies or serial programs (or portions thereof) that were filmed at locations that are at, or that are in the general vicinity of, the geographic location information provided by the user's mobile device 112. The user may select one or more of the listed movies or serial programs (or portions thereof) for immediate presentation. The selected content may then be accessed from the remote content system 110 or other suitable source of content for immediate presentation on the user's mobile device 112, and/or for presentation at a later time (such as when they return to their hotel or return home at the conclusion of their vacation).

As another example, the user geographic playlist 116 may indicate nearby locations that may be of interest to the user, such as restaurants, museums, buildings, shops, vehicles, vessels or the like. The user may then select a particular media content event (or portion thereof) for immediate presentation. For instance, the user may be ready for a meal. A particular media content event (or portion thereof) may pertain to a nearby restaurant. Accordingly, the user could access the media content event (or portion thereof) relating to the nearby restaurant, and obtain information that may help the user to decide whether they would like to eat at the restaurant or eat at another restaurant.

To illustrate, a locally produced serial (periodic) program that presents one or more video segments (portions) describing local restaurants may be available from the remote content system 110 that is accessible via the Internet or other suitable on-demand type system. Based on the geographic location information from the user's mobile device 112, a user geographic playlist 116 may be presented that lists media content events (or portions thereof), including segments from the locally produced program, that are in the vicinity of the user's geographic location. In response to a user selection made on one or more of the media content events (or portions thereof) listed on the presented geographic playlist 116, the one or more selected media content events (or portions thereof) may be immediately accessed from the remote content system 110 for immediate presentation to the user. Alternatively, or additionally, one or more selected media content events (or portions thereof) could be later presented to the user, such as when they are at their hotel room and are contemplating which restaurant to go to for their evening meal.

As another example, the user may be near a museum or an architecturally significant building, such as a church or a government office. The user could access information prior to going to the museum or architecturally significant building to enhance their visiting experience. Alternatively, or additionally, the user could view and/or listen to the selected media content event (or portion thereof) during, before, and/or after their visit to the museum or the architecturally significant building by selecting one or more media content events listed on a presented user geographic playlist 116.

To illustrate, a history-based channel may have previously presented media content events (or portions thereof) on a variety of historical topics. One or more of the media content events (or portions thereof) may be about a historical building and/or may be about historical events that occurred on the premises of the historical building. These historical-themed media content events (or portions thereof) may be available from the remote content system 110 that is accessible via the Internet or other suitable on-demand type system. Based on the geographic location information from the user's mobile device 112, a user geographic playlist 116 may be presented that lists media content events (or portions thereof), including segments from the locally produced program, that are in the vicinity of the user's geographic location. The user may select one or more of the related historical media content events (or portions thereof) for immediate presentation on their mobile device 112, and/or select one or more of the media content events (or portions thereof) for later viewing (such as when they return to their hotel or return home at the conclusion of their vacation). The selected one or more media content events (or portions thereof) is accessed from the remote content system 110 or other suitable source of content. In some situations, the selected media content event (or portion thereof) may be scheduled for broadcast at a future date and time. Accordingly, the selected media content event (or portion thereof) could be scheduled for recording (saving) at their media device 102 for later viewing.

As another example, the user may be near a vessel, such as a sailing ship or a famous war vessel. The user could access information about the ship or vessel to enhance their visiting experience. Alternatively, or additionally, the user could view and/or listen to the selected media content events (or portion thereof) by selecting one or more media content events listed on a presented user geographic playlist 116 at a later time to further enhance their previous visit to the ship or vessel.

As yet another example, the user may be interested in a particular person of interest, such as a historical figure, an actor, a director, a publisher, a celebrity, a politician, a musician, or the like. When in the vicinity of a location that is relevant to the person of interest, the user geographic playlist 116 would indicate available media content events (or portions thereof) relating to that person of interest. For example, many famous and historical people are known to be buried at Westminster Abbey in London. If the user is interested in a particular historical person who has been buried there, the user may select one or more of the media content events (or portions thereof) listed on the user geographic playlist 116 to learn more about that historical person.

In some embodiments, the geographic location information of a selected media content event (or portion thereof) is communicated to the particular mobile device 112 that the user is operating. The geographic location information associated with the selected media content event (or portion thereof) may be presented to the user on the display 118 of their mobile device 112. The presented location information may be used to provide an address, and/or travel directions, so that the user may move to a more precise location associated with the selected media content event (or portion thereof).

General operation of providing broadcasted content via the exemplary environment of FIG. 1 is now described in greater detail. An exemplary media device 102 includes, but is not limited to, a set top box (STB) that is communicatively coupled to the broadcast system 108. Other embodiments of the media device 102 include a television (TV), a digital video disc (DVD) player, a digital video disc (DVD) recorder, a game playing device, or a personal computer (PC). The media device 102 is configured to present and/or store selected media content events that are received in the media content stream 114.

The media content stream 114 comprises a plurality of streamed media content events. Some media content broadcast facilities 106 simultaneously broadcast many media content events, even hundreds of broadcast media content events, in the media content stream 114. The media device 102, when in operation, is configured by a user to select one of the plurality of simultaneously broadcast media content events for presentation on a media presentation device 120. Exemplary media presentation devices include, but are not limited to, TV's, stereos, radios, surround sound systems, personal computers or the like that may be communicatively coupled to the media device 102 that is receiving the media content stream 114. In some embodiments, the media device 102 and the media presentation device 120 may be an integrated single electronic device In the various embodiments, the media device 102 receives the media content stream 114 over the broadcast system 108. In the various embodiments, the plurality of media content events are broadcast to the media device 102 over the broadcast system 108. Broadcasting is the communication of media content to the media device 102, in an open ended fashion. The media content is broadcast over a dispersed, open ended destination, audience wherein any particular ones of a plurality of media devices 102 may receive the broadcast media content. The media device 102 is configured by their respective user to receive the broadcast media content via the broadcast system 108. To receive the media content, the media devices 102 are "tuned" to receive media content of interest.

An exemplary broadcast system 108 comprises a satellite broadcast system 130. One or more of the media content streams 114 reside in a transport channel 132 that is uplinked to a plurality of satellites 134, via a corresponding transmit antenna 136. The respective transport channels are then communicated, in the form of a wireless signal 138, from one or more of the satellites 134 down to a receiver antenna 140 that is communicatively coupled to the media device 102. The received wireless signal 138 (with the media content stream 114) is then communicated from the receiver antenna 140 to the media device 102. The receiver antenna 140 and the media device 102 may be configured to receive multiple wireless signals 138 from a plurality of satellites 134. The other media devices (not shown) may similarly receive the media content stream 114 over the satellite broadcast system 130.

Alternatively, or additionally, the plurality of media content events may be broadcast to the media device 102 via an over the air (OTA) system 142. For example, the media content broadcast facility 106 may be a local program provider that broadcasts media content events to the media device 102 using a wireless signal 144. The received wireless signal 144 with the media content stream 114 is received at the receiver antenna 140, or may be received directly by a receiver (not shown) residing in the media device 102. The mobile devices 112 may similarly receive the media content stream 114 via OTA system 142.

Alternatively, or additionally, the plurality of media content events may broadcast to the media device 102 via a cable system 146. For example, the media content broadcast facility 106 may employ a coaxial cable and/or fiber optic cable 148 that is coupled to the media device 102. The media content stream 114 is received directly by the media device 102.

In some situations, one or more of the media content events (or portions thereof) listed on a presented geographic playlist 116 may be scheduled for broadcast at a future date and time. Accordingly, the selected media content event (or portion thereof) could be scheduled for recording (saving) at their media device 102 for later viewing. When the selected media content event (or portion thereof) is actually broadcast over the broadcast system 108, the media device 102 associated with the user may record (store) the broadcasted media content event (or portion thereof).

The media device 102, the geographic location playlist device 104, the media content broadcast facility 106, the broadcast system 108, the optional remote content system 110, and/or the plurality of mobile devices 112 may be configured to communicatively couple to each other via the communication system 128. Accordingly, geographic location information, geographic playlists 116, and or selected media content events (or portions thereof) may be communicated between devices via the communication system 128.

The communication system 128 is illustrated as a generic communication system. In one embodiment, the communication system 128 comprises the Internet. Alternatively, the communication system 128 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the geographic location playlist generation system 100 may be implemented on other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the geographic location playlist generation system 100 may be employed on combination systems having a plurality of segments which employ different formats for each segment employing different technologies on each segment.

Figure 2:
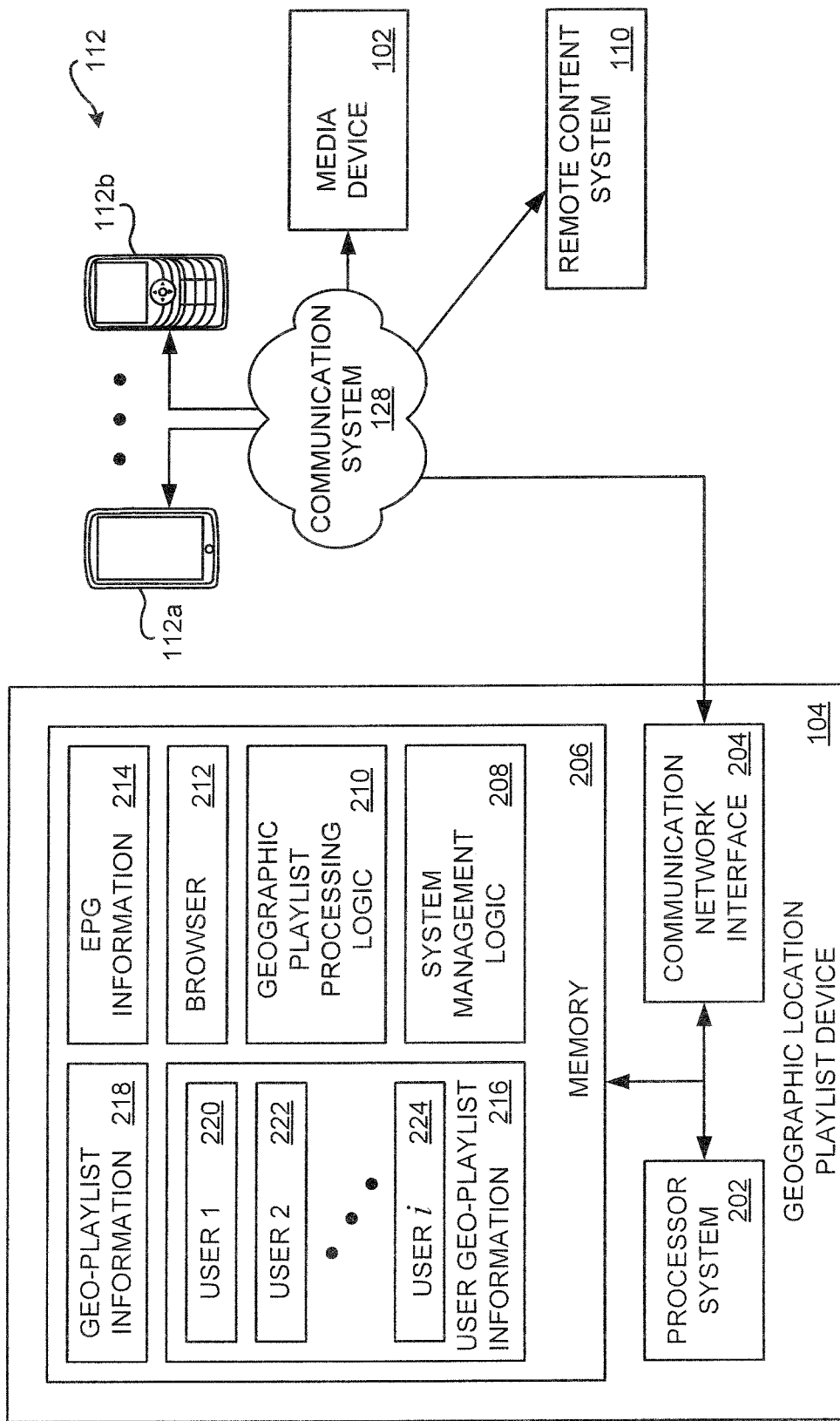
FIG. 2 is a block diagram of an embodiment of an example geographic location playlist device.

FIG. 2 is a block diagram of an embodiment of an example geographic location playlist device 104. The geographic location playlist device 104 comprises a processor system 202, a communication network interface 204, and a memory 206. The memory 206 comprises portions for storing the system management logic 208, geographic playlist processing logic 210, browser 212, electronic program guide (EPG) information 214, user geographic playlist (geo-playlist) information 216, and geographic playlist (geo-playlist) information 218. The processor system 202, executing the system management logic 208, manages various operation activities of the geographic location playlist device 104. An example function of the system management logic 208 is to establish connections to mobile devices 112 that are providing geographic location information.

In some embodiments, the system management logic 208, the geographic playlist processing logic 210, and/or the browser 212 may be integrated together, and/or may be integrated with other logic. In some embodiments, the electronic program guide (EPG) information 214, the user geographic playlist information 216, and/or the geographic playlist information 218 may be integrated together, may be integrated with other data, and/or may reside in separate memory mediums. In some embodiments, some or all of these memory and other data manipulation functions may be provided by and using remote server or other electronic devices suitably connected via the Internet or otherwise to a client device. Other geographic location playlist devices 104 may include some, or may omit some, of the above-described components. Further, additional components not described herein may be included in alternative embodiments.

In an example environment, the geographic location playlist device 104 is a server-based device that is configured to electronically receive information and provide information to the media device 102 and/or the mobile devices 112 via the communication system 128. Accordingly, the communication network interface 204 is configured to provide concurrent connectivity to a plurality of media devices 102 and/or mobile devices 112.

In some embodiments, the EPG information 214 is included in and/or resides in the memory 206 of the geographic location playlist device 104. The EPG information 214 may have, but is not limited to, information about media content events that are scheduled for broadcasting to the media devices 102 via the broadcast system 108. The EPG information 214 includes the title, along with the scheduled time and date of the presentation of the broadcasted media content event. A brief description of the broadcasted media content event may also be provided in the EPG information 214. The EPG information 214 also may indicate the "channel" of the available broadcasted media content event. The channel identifies the originating source of the program, such as a television studio, a premium movie provider, a national program provider, etc. The EPG information 214 is periodically updated by the content provider. In some embodiments, the EPG information 214 stored at the geographic location playlist device 104 is the same, or is substantially the same, as EPG information that is provided to the media device 102.

In an example embodiment, the geographic playlist information 218 is configured as a database structure. The database comprises a list that identifies media content events (or portions thereof) and at least one associated geographic location. Multiple geographic locations may be associated with any particular media content event (or portion thereof). Other information, such as and identifier and/or a title of each media content event (or portion thereof), a comment about the media content event (or portion thereof), a specification of a category associated with the media content event (or portion thereof), a location of where the media content event (or portion thereof) can be accessed, and other information of interest may be included as part of the geographic playlist information 218.

The user geographic playlist information 216 comprises portions for storing information that may be used to define the generated user geographic playlists 116 that are presentable to a user. For example, geographic location playlist information for defining a first geographic playlist 116 for a first user is denoted as user 1 geographic playlist (GP) 220.

Other geographic location playlist information for defining a user geographic playlist 116 for a second user is denoted as user 2 geographic playlist (GP) 222. Since many different users may be providing geographic location information to the geographic location playlist device 104, the user geographic playlist information 216 includes geographic location playlist information defining a user geographic playlist 116 for an $i^{th}$ user of a plurality of users, denoted as user i geographic playlist (GP) 224.

For example, the geographic location playlist device 104 may receive geographic location information from the smart phone 112b that indicates a current, previous, and/or anticipated location of a first user via the communication system 128. Then, user geographic playlist information is generated based on the received geographic location information and one or more media content events (or portions thereof) that are associated with the received geographic location information. The generated user geographic playlist information for the first user may then be optionally stored into the "USER 1" geographic playlist 220 portion of memory 206. Alternatively, or additionally, the user geographic playlist information is communicated, via the communication system 128, to the media device 102 and/or the mobile devices 112. In such embodiments, the received user geographic playlist information is used to generate and present the current geographic playlist 116.

Similarly, geographic location information from a mobile device 112 associated with a second user may be received. This geographic location information indicates a current, previous, and/or anticipated location of a second user. Then, the user geographic playlist information is generated based on the received geographic location information and one or more media content events (or portions thereof) that are associated with the received geographic location information associated with the second user. The generated user geographic playlist information for the second user may then be optionally stored into the user 2 geographic playlist 222 portion of memory 206, and alternatively or additionally, may be communicated to a media device 102 and/or a mobile device 112 being used by the second user.

In the example embodiment of FIG. 2, the geographic location playlist device 104 is configured to generate user geographic playlist information for many users. Thus, the user geographic playlist information 216 provides for storing geographic location playlist information for a plurality of different users (as conceptually indicated by the user i geographic playlist 224).

In an example embodiment, a user subscribes to a service to receive generated playlists based on geographic location information provided by their mobile device 112. The service may be a free service or may be a paid-for service.

In some embodiments, the geographic location playlist device 104 continuously, or at least periodically on an ongoing basis, receives geographic location information from a subscribing user's mobile device 112. In such embodiments, the user's mobile device 112 continuously, or at least periodically on an ongoing basis, communicates (pushes) the geographic location information to the geographic location playlist device 104. Alternatively, or additionally, the geographic location information may be communicated from the user's mobile device 112 in response to a user initiated command or instruction. As the user moves about, the received geographic location information indicates a change in the user's location. Accordingly, updated or replacement geographic location playlist information is generated by the geographic location playlist device 104 based on the changes in the user's location (that is, a location change that exceeds a predefined threshold distance). The updated or replacement geographic location playlist information may then be saved into the user geographic playlist information 216 portion of memory 206 after determining a location change exceeding the predetermined threshold distance. The threshold distance may be predefined by an operator of the geographic location playlist device 104 and/or the user. The threshold distance may vary based on current location. For example, a first threshold distance may be used when the user is in a city, a shorter threshold distance may be used when the user is at a museum or shopping center, and a longer threshold distance may be used when the user is in the countryside or traveling between cities or the like. In some embodiments, the threshold distance may be adjusted based on a rate of travel of the user. For example, a first threshold distance may be used when the user is travelling in their automobile, a shorter threshold distance may be used when the user is walking, and a longer threshold distance may be used when the user is flying between different locations.

In an alternative embodiment, received geographic location information is stored by the geographic location playlist device 104. In response to receiving a request for geographic location playlist information initiated by the user, the geographic location playlist device 104 then generates the geographic location playlist information. In such embodiments, the geographic location playlist device 104 determines and generates geographic location playlist information only for requesting users, thereby reducing computational loading on the geographic location playlist device 104. That is, there may be many users who are moving about, but only a limited number of users who wish to receive updated or replacement geographic location playlist information.

Further, the locations for which updated or replacement geographic location playlist information may be limited based on a predefined duration (such as one hour, a day, a week, or a portion thereof). Alternatively, or additionally, the locations for which updated or replacement geographic location playlist information may be limited based on a predefined distance from the current location of the user (such as within 10 kilometers of the present location of the user), and/or based on a predefined distance of movement of the user (such as a 10 mile trip being travelled by the user).

The predefined duration and/or distance may be specified by the provider that manages operation of the geographic location playlist device 104. Alternatively, or additionally, the predefined duration and/or distance may be specified by the user. For example, the user may be interested in receiving geographic location playlist information for their travels during a particular day and/or their travels about some geographic region of interest. For example, user account information may provide for the user to pre-specify the predefined duration and/or distance for which geographic location playlist information will be determined. The user account information may be updated or changed at the discretion of the user. To illustrate, the user may specify a relatively short predefined duration and/or distance while in their home city, and then change the predefined duration and/or distance before they begin their vacation to a foreign city. In other embodiments, the specification of the predefined duration and/or distance may be included as part of a user request to receive updated or replacement geographic location playlist information.

In the various embodiments, the updated or replacement geographic location playlist information may be automatically communicated (pushed) to the user's mobile device 112 on a periodic basis so that a current and fresh geographic playlist 116 is readily available at the mobile device 112. In an example embodiment, the user may then view the user geographic playlist 116 at their convenience by requesting presentation of the user geographic playlist 116 that has been pushed to their mobile device 112.

In an example embodiment, the updated or replacement geographic location playlist information may be automatically communicated to the mobile device 112 based upon a change in the user's location by some predefined distance. Alternatively, or additionally, the updated or replacement geographic location playlist information may be automatically communicated to the mobile device 112 periodically based upon some predefined duration of time. To illustrate, an example embodiment may push the updated or replacement geographic location playlist information to the user's mobile device 112 after the user's location has changed by one kilometer (the predefined distance) and/or after expiration of a one hour period (the predefined duration) since the last previous communication of the updated or replacement geographic location playlist information to the user's mobile device 112.

Alternatively, or additionally, some embodiments will communicate updated or replacement geographic location playlist information in response to receiving a request from the user. The user initiates the request using their mobile device 112 and/or their media device 102. A request message or the like is sent from the mobile device 112 and/or the media device to the geographic location playlist device 104. In response, the geographic location playlist device 104 communicates the updated or replacement geographic location playlist information to the requesting mobile device 112 or media device 102. Alternatively, or additionally, the geographic location playlist device 104 communicates the updated or replacement geographic location playlist information to all mobile devices 112 and/or media devices 102 associated with that particular user in response to receiving the user request.

In some embodiments, the user request may include one or more parameters from which the geographic location playlist information is determined. For example, the user request may specify a particular location, such as a planned destination such as a city, a museum, a shopping center, a historical attraction, or other well known location. Alternatively, or additionally, the user request may include specification of categories, topics, or the like of interest to the user. In response to a user request, embodiments will communicate updated or replacement geographic location playlist information to the mobile device 112 based on the user's request.

Operation of an example embodiment of the geographic location playlist generation system 100 is now generally described. The processor system 202, executing the geographic playlist processing logic 210, determines a location of a particular mobile device 112 based on the received geographic location information. Then, the determined location of the mobile device 112 is compared with the locations of the plurality of media content event (or portions thereof) stored in the geographic playlist information 218. When a match in a location associated with a media content event (or portion thereof) is found with the determined location of the mobile device 112, information identifying the associated media content event (or portion thereof) is used to generate the user geographic playlist information for that particular user. For example, the identifier of the media content event (or portion thereof) and a comment describing the relevance to the determined location may be retrieved from the geographic playlist information 218. The retrieved identifier and comment are added into the geographic location playlist information associated with that particular user. The geographic location playlist information may be added into the user geographic playlist information 216 portion associated with that particular user and/or may be communicated to one or more of the media devices and/or the mobile devices 112 associated with that particular user.

In some embodiments, a match between the determined location of a mobile device 112 and a location of a media content event (or portion thereof) may be determined if the respective locations are within some predefined distance threshold of each other. A match may be determined when the mobile device 112 location and the media content event location are within a predefined threshold distance of each other. For example, if the mobile device 112 and the location of a media content event (or portion thereof) are within one kilometer of each other, then the geographic location playlist generation system 100 may determine an occurrence of a match, and then add the identifier of the media content event (or portion thereof) and the associated comment retrieved from the geographic playlist information 218 into the user geographic playlist information 216 portion associated with that particular user.

The predefined threshold distance may be specified by the provider that manages operation of the geographic location playlist device 104. Alternatively, or additionally, the predefined threshold distance may be specified by the user.

Threshold distances may be variable based on various conditions (speed of movement or travel, particular location characteristics, etc.). The predefined distance threshold may be a variable value that is defined based upon the particular interest of the user. For example, if the user is interested in a category pertaining to food, the predefined distance threshold may be a relatively short distance. Thus, the listed media content event (or portion thereof) may pertain to restaurants that the user could readily walk to. In another situation, for that user or a different user, the predefined distance threshold may be relatively larger if the category pertained to a person, such as a historical figure. Thus, the listed media content event (or portion thereof) could be a historical site that the user could travel to by car, bus or taxi. Accordingly, the predefined distances may be defined based on a characteristic that is associated with a category that is user specified or that is associated with a type of media content event (or portion thereof).

In the various embodiments, a presented geographic playlist 116 is configured to permit the user to select one of the media content events (or portions thereof) for presentation on their mobile device 112. Accordingly, embodiments of the geographic location playlist device 104 may execute the browser 212 to identify a source of the selected media content event (or portion thereof). For example, the selected media content event (or portion thereof) may be available from the remote content system 110. Accordingly, information for establishing a link between the user's mobile device 112 and the remote content system 110, and information for accessing the selected media content event (or portion thereof), may be communicated to the user's mobile device 112. In response to receiving the information, the user's mobile device could then access the selected media content event (or portion thereof), and initiate presentation of the media content event (or portion thereof) on the display 118 of the mobile device 112.

Alternatively, or additionally, embodiments of the geographic location playlist device 104 may search the EPG information 214 for the selected media content event (or portion thereof). If the selected media content event (or portion thereof) is found in the EPG information 214, recording information (information specifying the storing of the media content event or portion thereof based on the scheduled channel, date and time of broadcast) may be communicated to the media device 102. In response, the media device 102 may record the specified media content event (or portion thereof) so that the user may later view the stored media content event (or portion thereof). In some embodiments, the recording information is communicated to the user's mobile device 112. The user may then opt to record (save) that particular media content event (or portion thereof). A confirmation to record may then be communicated back to the geographic location playlist device 104 (wherein the recording information is then communicated from the geographic location playlist device 104 to the media device 102). Alternatively, or additionally, the recording information may be sent from the user's mobile device 112 to the media device 102 so that a recording of the selected media content event (or portion thereof) is scheduled by the media device 102.

Figure 3:
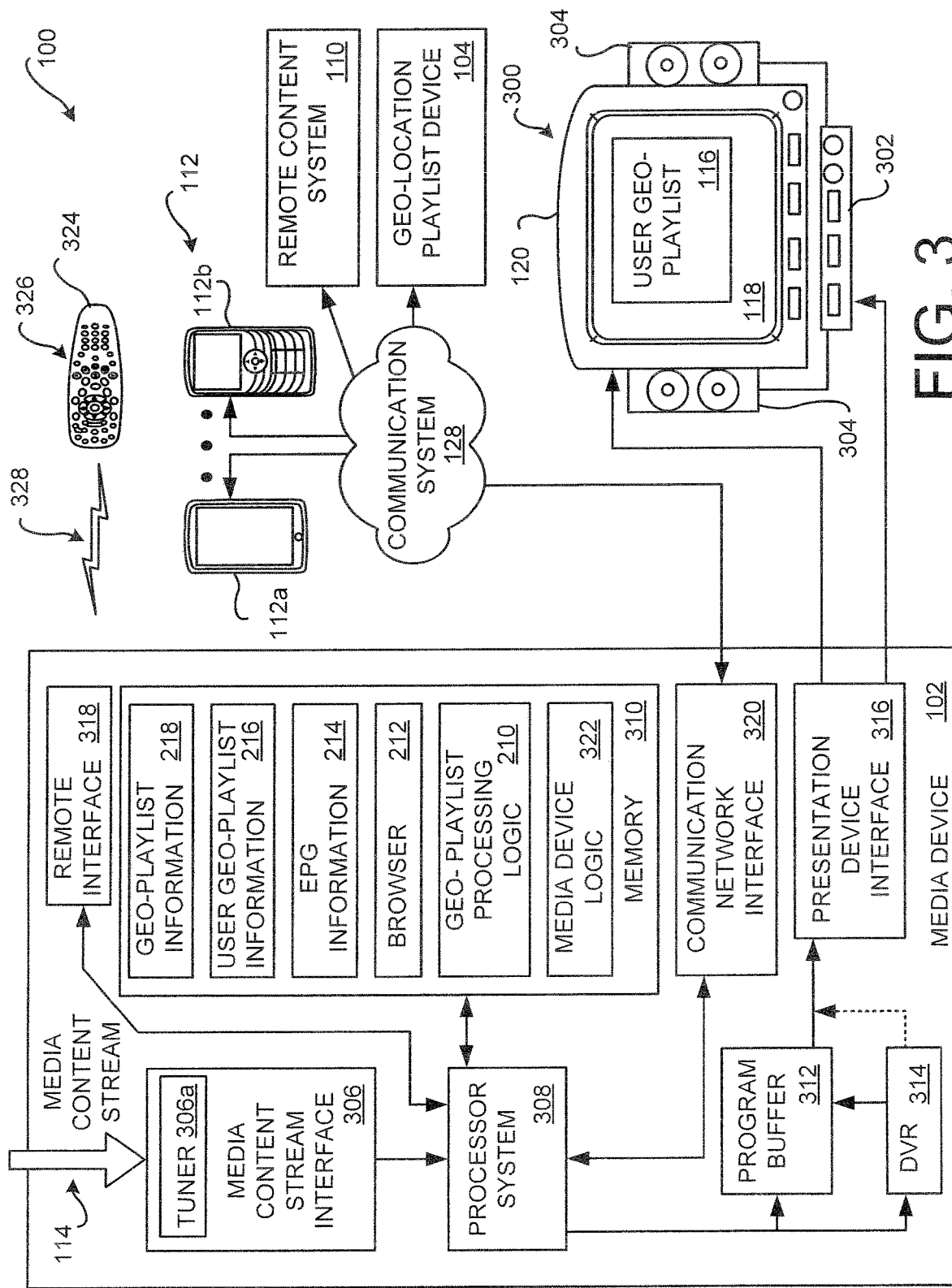
FIG. 3 is a block diagram of the geographic location playlist generation system implemented in an example media device.

FIG. 3 is a block diagram of the geographic location playlist generation system 100 implemented in an example media device 102, such as, but not limited to, a set top box (STB). Embodiments of the geographic location playlist generation system 100 may be implemented in other media devices, such as, but not limited to, stereos, surround-sound receivers, radios, televisions (TVs), digital video disc (DVD) players, digital video recorders (DVRs), cellular phones equipped with video functionality, personal device assistants (PDAs), game playing devices, or personal computers (PCs) that are configured to present a video-based media content event that is received in a media content stream 114.

The exemplary media device 102 is communicatively coupled to a media presentation system 300 that includes a visual display device, such as a television 120 (hereafter, generically a TV), and an audio presentation device 302, such as a surround sound receiver controlling an audio reproduction device (hereafter, generically, a speaker). Other types of output devices may also be coupled to the media device 102, including those providing any sort of stimuli sensible by a human being, such as temperature, vibration and the like. The video portion of the media content event is displayed on the display 118 and the audio portion of the media content event is reproduced as sounds by one or more speakers 304. In some embodiments, the media device 102 and one or more of the components of the media presentation system 300 may be integrated into a single electronic device.

The non-limiting exemplary media device 102 comprises a media content stream interface 306, a processor system 308, a memory 310, a program buffer 312, an optional digital video recorder (DVR) 314, a presentation device interface 316, a remote interface 318, and a communication network interface 320. The memory 310 comprises portions for storing the media device logic 322, the geographic playlist processing logic 210, the browser 212, the electronic program guide (EPG) information 214, the user geographic playlists (geo-playlists) 216, and the geographic playlist (geo-playlist) information 218. In some embodiments, the media device logic 322, the geographic playlist processing logic 210, and/or the browser 212 may be integrated together, and/or may be integrated with other logic. In some embodiments, the electronic program guide (EPG) information 214, the user geographic playlist information 216, and/or the geographic playlist information 218 may be integrated together, may be integrated with other data, and/or may reside in separate memory mediums. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set top box, is now broadly described. A media content provider provides a plurality of media content events (interchangeably referred to herein as media content) that is received in one or more multiple media content streams 114 multiplexed together in one or more transport channels. The transport channels with the media content streams 114 are communicated to the media device 102 from a media system sourced from the media content broadcast facility (FIG. 1) operated by the media content provider. Non-limiting examples of such media systems include the satellite broadcast system 130, the over the air system 142, the cable system 146, and the Internet (communicatively coupled to the media device 102 via the communication system 128). For example, if the media content provider provides programming via a satellite-based communication system, the media device 102 is configured to receive one or more broadcasted satellite signals detected by the antenna 140 (FIG. 1). Alternatively, or additionally, the media content stream 114 can be received from one or more different sources, such as, but not limited to, a cable system, a radio frequency (RF) communication system, or the Internet.

The one or more media content streams 114 are received by the media content stream interface 306. One or more tuners 306a in the media content stream interface 306 selectively tune to one of the media content streams 114 in accordance with instructions received from the processor system 308. The processor system 308, executing the media device logic 322 and based upon a request for a media content event of interest specified by a user, parses out media content associated with the media content event of interest. The media content event of interest is then assembled into a stream of video and/or audio information which may be stored by the program buffer 312 such that the media content can be streamed out to components of the media presentation system 300, such as the visual display device (such as the example television 120) and/or the audio presentation device 302, via the presentation device interface 316. Alternatively, or additionally, the parsed out media content may be saved into the DVR 314 for later presentation. The DVR 314 may be directly provided in, locally connected to, or remotely connected to, the media device 102. In alternative embodiments, the media content streams 114 may stored for later decompression, processing and/or decryption.

From time to time, information populating the EPG information 214 portion of the memory 310 is communicated to the media device 102, via the media content stream 114 or via another suitable media. The EPG information 214 stores the information pertaining to the scheduled programming. The information may include, but is not limited to, a scheduled presentation start and/or end time, a program channel, and/or descriptive information. The program's descriptive information may include the identifier of the program, names of performers, directors or actors; date of creation; and/or a summary describing the nature of the program. Any suitable information may be included in the program's supplemental information. Upon receipt of a command from the user requesting presentation of an EPG display, the information in the EPG information 214 is retrieved, formatted, and then presented on the display 118 as an EPG.

The exemplary media device 102 is configured to receive commands from a user via a remote control 324. The remote control 324 includes one or more controllers 326. The user, by actuating one or more of the controllers 326, causes the remote control 324 to generate and transmit commands, via a wireless signal 328, to the media device 102. The commands control the media device 102 and/or control components of the media presentation system 300. The wireless signal 328 may be an infrared (IR) signal or a radio frequency (RF) signal that is detectable by the remote interface 318. For example, but not limited to, the commands may control presentation of information shown on a presented geographic playlist 116.

The processes performed by the media device 102 relating to the processing of the received media content stream 114 and communication of a presentable media content event to the components of the media presentation system 300 are generally implemented by the processor system 308 while executing the media device logic 322. Thus, the media device 102 may perform a variety of functions related to the processing and presentation of one or more media content events received in the media content stream 114.

In a first example embodiment of the media device 102, the processor system 308, executing the geographic playlist processing logic 210, receives geographic location playlist information from the geographic location playlist device 104. Then, the received user geographic location playlist information is used to generate a user geographic playlist 116 that is presented on the display 118 For example, the identifier of the media content event (or portion thereof) and a comment describing the relevance to the determined location may be presented to the user. Alternatively, or additionally, the received geographic location playlist information is stored in the user geographic playlist information 216 portion of memory 310 so that the user geographic playlist 116 may be generated and presented at a later time.

From time to time, updated or replacement geographic location playlist information is received from the geographic location playlist device 104. Accordingly, the geographic playlist processing logic 210 can update the geographic location playlist information in the user geographic playlist information 216. For example, new entries may be added for one or more media content events (or portions thereof) as the user moves to a new location.

Alternatively, or additionally, stale entries in the user geographic playlist information 216 may be deleted, erased or otherwise discarded as the location of those stale entries are no longer relevant to the user. For example, stale entries may be defined based on a duration of time, such as twenty four hours. Thus, if the user is travelling in a first city and then moves to a next city during their vacation, the stale entries pertaining to the locations of the first city may be optionally deleted. Alternatively, or additionally, stale locations may be defined based on some predefined distance threshold. The predefined duration and/or distance may be specified by the provider that manages operation of the geographic location playlist device 104. Alternatively, or additionally, the predefined duration and/or distance may be specified by the user. For example, if the first city and the second city above are one hundred miles apart, a distance threshold of fifty miles may be used to delete stale entries associated with the first city as the user travels to the second city. In such embodiments, the entries in the user geographic playlist 116 are maintained in a current state so as to remain relevant to the user's current locations (as determined by their mobile device 112).

In a second embodiment of the media device 102, the geographic location information is communicated from the mobile devices 112 to the media device 102. The location information may then be communicated from the media device 102 to the geographic location playlist device 104 so that the geographic location playlist information can be determined at the geographic location playlist device 104. Then, the geographic location playlist information may be communicated from the geographic location playlist device 104 to the media device 102.

For example, the geographic location playlist device 104 may be communicatively coupled to the media device 102 via a cable system that is also providing the media content stream 114. Thus, a proprietary geographic location playlist device 104 may be managed and maintained by the service provider in a more secure, reliable, and cost efficient manner. In such embodiments, the communication network interface 204 in the geographic location playlist device 104 may be omitted to reduce component costs and to avoid service access charges assessed by owners of the communication system 128.

In a third embodiment of the media device 102, the media device 102 receives geographic location information from the mobile devices 112. The processor system 308, executing the geographic playlist processing logic 210, determines a location of a particular mobile device 112 based on the received geographic location information. Then, the determined location is compared with locations residing in the geographic playlist information 218. When a match in a location associated with a media content event (or portion thereof) is found with the determined location of the mobile device 112, information identifying the associated media content event (or portion thereof) may be used to generate the geographic location playlist information for that particular user. For example, the identifier of the media content event (or portion thereof) and a comment describing the relevance to the determined location may be retrieved from the geographic playlist information 218 residing in memory 310, and may be added into the user geographic playlist information 216 portion associated with that particular user.

In the example third embodiment, updates to and/or replacement of the geographic playlist information 218 is received from time to time at the media device 102 from an external source, such as, but not limited to, the geographic location playlist device 104. Alternatively, or additionally, updates to the geographic playlist information 218 may be obtained by using the browser 212. Updates to and/or replacement of the geographic playlist information 218 may be received from any suitable remote source.

Alternatively, or additionally, the geographic playlist information 218 may be generated from, or at least in part from, the EPG information 214. For example, a travel show may indicate locations of featured attractions in the metadata in the received media content event. As another example, the metadata may identify a restaurant by its name and general location, such as the city where the restaurant is located. The browser 212 could then be used to obtain a more accurate location for the featured attraction or restaurant for inclusion in the geographic playlist information 218 that is generated from the EPG information.

FIG. 4 conceptually illustrates an example format of a database 400 used for an exemplary geographic playlist information 218. The example database 400 comprises a listing of unique identifiers, such as the titles 402, of a plurality of media content events (or portions thereof). For example, the identifier "CONTENT TITLE 1" is appreciated to correspond to the title of a first media content event (or portion thereof) that is listed in the database 400. The identifiers "CONTENT TITLE 2" though "CONTENT TITLE i" indicate other ones of the plurality of media content events (or portions thereof) populating the database 400. Any suitable unique identifier that uniquely identifies each one of the plurality of media content events may be used in the various embodiments.

Associated with each identifier of a particular media content event (or portion thereof) is at least one geographic location 404. For example, the "GEO-LOC 1A" is a geographic location that is associated with the first listed media content event (or portion thereof) that has been identified by its respective "CONTENT TITLE 1" entry.

Any particular listed media content event (or portion thereof) may have a plurality of associated geographic locations. For example, the second listed media content event (or portion thereof) that has been identified by its respective "CONTENT TITLE 2" entry may be a movie that has scenes that were filed at a plurality of different locations. Accordingly, the geographic locations "GEO-LOC 2A" through "GEO-LOC 2n" are the plurality of different geographic locations that have been associated with the second listed media content event (or portion thereof).

When embodiments of the geographic location playlist generation system 100 receive geographic location information from a mobile device 112, the geographic location of the mobile device 112 (and therefore, presumably the location of the user) is determined. This determined geographic location of the mobile device 112 is then compared with the listed geographic locations in the geographic locations 404 portion of the database 400. In the event that a match between the determined geographic location of the mobile device 112 and one of the listed geographic locations in the geographic locations 404, the associated identifier of the media content event (or portion thereof) may be added to the geographic location playlist information that is used to generate a user geographic playlist 116.

For example, if the determined geographic location of the mobile device 112 matches (at least within some predefined distance threshold) with the geographic location "GEO-LOC 3B" in the geographic locations 404, then the media content event (or portion thereof) identified by the name "CONTENT TITLE 3" may be added to the geographic location playlist information that is used to generate a user geographic playlist 116. Further, if the determined geographic location of the mobile device 112 matches (at least within some predefined distance threshold) with the geographic location "GEO-LOC 1A" in the database 400, then the media content event (or portion thereof) identified by the name "CONTENT TITLE 1" may also be added to the geographic location playlist information.

Comments may be optionally included in the comments portion 406 of the database 400. Comments are a brief textual description explaining some characteristic about the associated media content event (or portion thereof) and/or an explanation of the geographic location significance or relationship of the associated media content event (or portion thereof). For example, the comment "COM 1A" associated with the first media content event (or portion thereof) listed as "CONTENT TITLE 1" may indicate a geographic location where a scene of the media content event (or portion thereof) was filmed.

Further, comments may be associated with geographic locations. For example, the comment "COM 1A" may be associated with the geographic location "GEO-LOC 1A" in the comments 406 portion. Thus, when the comment ("COM 1A") is included as part of the presented geographic playlist 116, the user will better appreciate the relevance of the listed media content event (or portion thereof) to their current location (that was provided by their mobile device 112).

Similarly, the comment "COM 1B" may be associated with the geographic location "GEO-LOC 1B" in the database 400. Accordingly, if the current geographic location information from the mobile device 112 corresponds to the second location ("GEO-LOC 1B), the comment ("COM 1B") is then included as part of the presented geographic playlist 116. Furthermore, it is appreciated that the comment "COM 1A" would not be included since the current location of the mobile device 112 does not match the associated "GEO-LOC 1A" in the geographic locations 404. Other comments associated with different geographic locations would also be omitted from the presented geographic playlist 116. Accordingly, the user will better appreciate the relevance of the listed media content event (or portion thereof) to their current location.

In practice, the number of media content events (or portions thereof) may be very large, numbering into the thousands or even hundreds of thousands of media content events (or portions thereof). To facilitate an efficient and effective searching process where the listed geographic locations in the database 400 are compared with a determined geographic location of the mobile device 112, one or more categories may be optionally associated with each particular media content event (or portion thereof). Categories are identified using a suitable category identifier, which is a string of alpha numeric characters. Accordingly, the category identifiers (interchangeably referred to herein as category names) are intuitively understood by the user to identify the category associated with a particular media content event (or portion thereof).

One example type of category is a theme type category defined herein as category that is based on, and thus is named for, a theme-based characteristic of a media content event (or portion thereof). Another non-limiting example is a content type category, which is defined herein as category that is based on a type of the media content event (or portion thereof). Another non-limiting type of category is the object type category defined herein as category that is based on, and thus is named for, an object that is associated with a media content event (or portion thereof).

A variety of categories may be used by the various embodiments. For example, content type categories for media content events may include, but are not limited to, movies, serial programs, sporting events, travel programs, cooking programs, animation programs, historical programs, news broadcasts, and even advertisements, commercials or the like. Object type categories may include, but are not limited to, names of individual objects or people (actors, directors, publishers, celebrities, politicians, singers, musicians, athletes, historical figures, etc.). Theme type categories for media content events may include generalized classes of physical objects (museums, political offices, businesses, architecturally or historically significant buildings, automobiles, aircraft, ships, natural scenery such as mountains or canyons, etc.). Object type categories for media content events may include, but are not limited to, names of individual objects (such as the unique names of a museum, a political office, a businesses, an architecturally or historically significant building, an automobile, an aircraft, a ship, a natural scenery object such as a mountain or canyon, etc.) or people (names of actors, directors, publishers, celebrities, politicians, singers, musicians, athletes, historical figures, etc.). Any suitable category of interest for media content events may be defined for the various embodiments of the geographic location playlist generation system 100.

In practice, the user may specify one or more predefined category identifiers of interest that are stored in the categories 408 portion of the database 400. A selected category identifier (or multiple selected category identifiers) will then be used to search the database 400. When a search of the database 400 is conducted, the comparison of the determined geographic location of the mobile device 112 with geographic location information stored in the database 400 is searched only for those media content events (or portions thereof) that have been associated the specified category identifiers.

Any particular listed media content event (or portion thereof) in the database 400 may have one or more associated categories which are stored in the categories 408 portion of the database 400. For example, category "CAT 1A" is associated with the first listed media content event (or portion thereof). The category "CAT 2A" and category "CAT 2B" are associated with the second listed media content event (or portion thereof). Thus, if the category "CAT 1A" is specified, the geographic locations associated with the first media content event (or portion thereof) identified as "CONTENT TITLE 1" is searched. If the category "CAT 1A" and the category "CAT 2B" are the same, for example, then the geographic locations associated with the first and the second media content events (or portions thereof) are searched.

Information specifying the categories may be communicated from the user's mobile device 112 concurrently with, or separately from, the communication of the geographic location information. To illustrate, the user may be on vacation in a foreign city and may be interested in a particular musician. The user may specify an object type category of "musicians" (or even specify the musician's name). When a search of the database 400 is conducted, the comparison of the determined geographic location of the mobile device 112 with geographic location information stored in the database 400 is searched only for those media content events (or portions thereof) that have been associated the musicians category (or that have been associated with the musician's name). Thus, other media content events (or portions thereof) that are not associated with the musicians category, such as media content events (or portions thereof) that have been associated with restaurants or history, will not be searched.

Alternatively, or additionally, categories may be automatically selected for searching the database 400 based on information that is derived from the determined geographic location of the mobile device 112. In such embodiments, geographic locations are associated with one or more particular categories. When the geographic location of the mobile device 112 is determined, that determined geographic location may be then used to identify particular categories that have been associated with that particular location.

For example, the determined geographic location of the mobile device 112 may indicate that the user is currently in a shopping mall. Thus, an embodiment may automatically select categories such as shops, restaurants, and/or other places of interest that typically are associated with a shopping mall. As another non-limiting example, when the user's mobile device 112 is in proximity to a museum, the embodiment may automatically select categories that are associated with historical buildings, art objects, historical figures, and/or historical events that may be topics associated with museums.

As another example, the determined geographic location of the mobile device 112 may tend to indicate that the user is currently located in a region known for growing grapes that are used in making wine. Accordingly, a location associated with wine making and/or vineyards may be automatically selected by the geographic location playlist generation system 100. Accordingly, a user geographic playlist 116 listing media content events (or portions thereof) pertaining to wine making and/or vineyards may be presented to the user. Further, the user may additionally specify a category to further filter searching. For example, the user may specify "movies" as a category such that movies associated with wine making and/or vineyards is the region of the determined geographic location of the mobile device 112 are identified. As another example, the user may specify "restaurants" as a category such that the search returns media content events (or portions thereof) pertaining to restaurants that are in the vicinity of the wine making and/or vineyards region.

In some embodiments, information identifying a location where a listed media content event (or portion thereof) may be accessed is included in the content location 410 portion of the database 400. For example, if the first media content event (or portion thereof) is available from the remote content system 110, connectivity and/or access information is stored in the associated content location 410. Accordingly, if the user selects the first media content event (or portion thereof) for presentation on their mobile device 112 or for presentation or recording at their media device 102, the connectivity and/or access information is used for accessing this first media content event (or portion thereof). In this situation, information to establish a link to the remote content system 110 is provided to the mobile device 112 so that the remote content system 110 is accessed. Further, information identifying the media content event (or portion thereof) is provided so that the remote content system 110 can access and then communicate that particular specified media content event (or portion thereof) to the mobile device 112 (or the media device 102).

Alternatively, or additionally, the media content event (or portion thereof) may be scheduled for broadcast at a future time. The channel, date and time of the future broadcast can be determined from the EPG information 214. Accordingly, the channel, date and time of the future broadcast of the media content event (or portion thereof) may be saved into the content location 410 portion of the database 400. This information, when presented to the user, may inform the user of the option of later viewing the identified media content event (or portion thereof) and/or the option of having their media device record the identified media content event (or portion thereof).

In many situations, the entirety of a particular media content event is stored in a single location, such as at the remote content system 110. In such situations where a particular media content event is segmented into a plurality of portions, information identifying the location of each portion within the media content event is stored in the content location 410 portion of the database 400. Accordingly, when a user selects a portion of a media content event for presentation, embodiments can communicate the location information of the portion of interest so that only that portion is presented or recorded.

In an example embodiment, the start and the end of a particular portion of a media content event is identified and saved into the content location 410 portion of the database 400. The start and end of the portion may be identified my a time stamp or the like. Alternatively, or additionally, the start and end of the portion may be identified by a time stamp of the start and a specified duration or the portion. Other suitable references in the media content event, such as tags, metadata information, frame identifiers, or the like may be used to identify the start and end of a portion of a media content event.

In an example embodiment, the source of the selected media content event, such as the remote content system 110, is configured to provide the requested portion of the media content event. The requested portion of the media content event may then be communicated to the user's mobile device 112 and/or to the media device 102 for presentation and/or recording. In another embodiment, the entirety of the media content event is communicated, and is then later segmented into the portion of interest. For example, if the user specifies that the media device 102 is to record the portion of interest, the entirety of the media content event may communicated and/or is broadcast to the media device 102 such that the portion of interest is recorded when received at the media device 102.

In some situations, the predefined threshold distances used for matching the determined geographic location of the mobile device 112 with the geographic locations stored in the geographic locations 404 portion of the database 400 may be different. For example, the predefined distances may be defined based on a specified category. For instance, if the "restaurants" category is specified, the predefined threshold distance may be relatively short, such as a few hundred yards or a kilometer. Thus, the user could easily walk to or drive to a restaurant that is identified in a media content event (or portion thereof) that is listed in a presented user geographic playlist 116. On the other hand, if a "historical event" category is listed, the predefined threshold distance may be several kilometers, or even hundreds of kilometers, so that the user could make travel plans to visit the location associated with the historical event that is associated with the media content event (or portion thereof) that is listed in a presented user geographic playlist 116. These category-based predefined threshold distances are stored is a suitable location in the database 400 or in another suitable memory medium. Threshold distances may be user specific. For example, a first user may have access to an automobile, such as a rented car while on vacation. In contrast, a second user may be relying on public transportation, such as a taxi cab, a bus, or the like. Accordingly, the threshold distance for the first user may be greater than the threshold distance for the second user.

Any suitable database format for the database 400 may be used by the various embodiments. For example, the database 400 may be configured as a relational database. In some embodiments, the above-described information of the database 400 may be distributed over a plurality of memory mediums, some of which may be remotely located.

FIG. 5 is an illustration of an example embodiment of a user geographic playlist 500. The example user geographic playlist 500 includes a listing of the identifier, such as the title, of at least one media content event (or portion thereof) that has an associated geographic location that corresponds to (matches) the determined geographic location of the mobile device 112. The user geographic playlist 500 corresponds to the user geographic playlist of FIG. 1.

The user geographic playlist 500 is arranged in a column format with a column 502 indicating content identifiers and a column 504 indicating content comments ("content com") pertaining to the adjacent associated listed media content event (or portion thereof). Any suitable format may be used to present information on a user geographic playlist 116. Further, additional information, such as associated category identifiers and or a specific address, may be included on a presented user geographic playlist 500.

The user geographic playlist 500 is configured to be presented on the display 118 of the mobile device 112 or a display 118 communicatively coupled to the media device 102 (FIG. 1). When the display 118 of the mobile device 112 is relatively small, the content of the presented user geographic playlist 500 may be limited so as to improve visibility and/or readability for the user. If the display is relatively large, additional information may be added to a presented user geographic playlist 500. Further, font sizes and or font types may be adjusted to optimize visibility and/or readability for the user.

In the event that a large number of media content events (or portions thereof) are listed in a presented user geographic playlist 500, such that all of the listed media content events (or portions thereof) cannot be concurrently presented on the display 118, a user may operate their mobile device 112 to scroll down, and/or page down, through the listings of media content events (or portions thereof). Some embodiments may permit the user to sort the listed media content events based on a user-specified search criteria and/or a user-specified category or the like that is specified by the user via their mobile device 112.

The information presented in column 504 is based on information stored in the comments 406 portion of the database 400 (FIG. 4). The presented information is selected so that the viewing user appreciates the relevance of the listed media content event (or portion thereof) to their current location (that was provided by their mobile device 112). Other information may include the location and/or an address pertaining to the listed media content event (or portion thereof).

In some embodiments, the presented user geographic playlist 500 is an interactive type graphical user interface (GUI) that the user may interact with. For example, the user may scroll down to a listed one of the media content events (or portions thereof), and then select that media content event (or portion thereof). If the display is a touch sensitive type display, the user may simply touch the particular listed media content event (or portion thereof) of interest to cause the selection.

For example, FIG. 5 illustrates that the second listed media content event (or portion thereof) identified as "CONTENT TITLE 2" has been selected by the user, as indicated by the bold lining 506 about that listed media content event (or portion thereof). Here, the comment 508 ("CONTENT COM 2") associated with the selected media content event (or portion thereof) has provided sufficient information for the viewing user to intuitively appreciate the significance of that particular media content event (or portion thereof) to their current location. Here, it is appreciated that the user is interested in viewing the selected media content event (or portion thereof) and/or in obtaining additional supplemental information about the selected media content event (or portion thereof).

Embodiments of the geographic location playlist generation system 100 may be configured to take a variety of actions in response to a user selection of one of the listed media content events (or portions thereof). Some embodiments may cause the selected media content event (or portion thereof) to be accessed and presented on the display 118. Alternatively, or additionally, the media device 102 may be configured to record the selected media content event (or portion thereof).

In some embodiments, selection of a listed media content event (or portion thereof) will change presentation on the display 118 to another screen display and/or GUI. FIG. 6 is an illustration of an example embodiment of a GUI 600 that is presented on the display 118 in response to a user's selection of one of the listed media content events (or portions thereof). Here, the title 602 of the selected media content event (or portion thereof) is indicated along with a portion that provides additional detailed information 604 pertaining to the selected media content event (or portion thereof).

In some embodiments, an active region 606 of the GUI 600 permits the user to cause the geographic location playlist generation system 100 to perform other specified actions. For example, if more descriptive information is available, the user may select the "More Information" option by appropriately activating the GUI 600. In response to selecting the "More Information" option, a new page is pretend with the additional descriptive information.

Alternatively, or additionally, embodiments may enable the user to initiate presentation of the selected media content event (or portion thereof). Here, the user may appropriately activate the GUI 600 such that the selected media content event (or portion thereof) is accessed and is immediately presented on the display 118.

Alternatively, or additionally, embodiments may enable the user to initiate a recording (storing) of the selected media content event (or portion thereof). Here, the user may appropriately activate the GUI 600 such that the selected media content event (or portion thereof) becomes scheduled for recording by the media device 102. In some embodiments, the mobile device 112 may become configured to record the selected media content event (or portion thereof).

In another embodiment of the user geographic playlist 116, an indication is presented to the user that informs the user that a list of media content events (or portions thereof) that are relevant to the determined geographic location of the mobile device 112 is available. The user may then selectively opt to have the user geographic playlist 116 presented.

In some embodiments, the user may be able to sort, filter, search, or otherwise screen a plurality of identified media content events (or portions thereof) prior to presentation of the user geographic playlist 116 on the display 118. For example, current user geographic playlist information may contain many listed media content events (or portions thereof). Here, a listing of selectable categories may be presented to the user prior to presentation of the user geographic playlist 116. The user may select one or more of the presented categories, and/or specify their own category of interest. Based on the selected categories, the entire list of identified media content events (or portions thereof) may then be filtered such that only those particular media content events (or portions thereof) that are associated with the selected categories are present on the user geographic playlist 116.

When filtering by a specified category, the user specified category is used to identify categories stored in the categories 408 portion of the database 400 that have been associated with media content events (or portions thereof). Alternatively, or additionally, a keyword search, based on one or more user-specified keywords, may be made for like or similar words that are stored in the comments portion 406 of the database 400 that have been associated with media content events (or portions thereof).

Further, in some embodiments that filter based on selected categories, the user may be permitted to navigate through a plurality of pages in a hierarchal manner to refine category selection. For example, a first presented page of general categories may list content type categories, such as movies, serial programs, sporting events, travel programs, cooking programs, animation programs, historical programs, news broadcasts, and even advertisements, commercials or the like. In response to selection of one of the content type categories, a list of more specific theme type categories and/or object type categories related to the selected general content type category may be presented. For example, the user may select the general content type category of cooking programs. Subcategories relating to cooking programs may then be offered. Example subcategories may include types of cuisine, restaurants, cooking techniques, names of chefs, or the like. In response to selecting one or more subcategories, one or more media content events (or portions thereof) that are associated with the selected subcategories, and that are within proximity to the determined geographic location of the mobile device 112, may be identified to generate geographic location playlist information. This geographic location playlist information is then used to present a user geographic playlist 116 to the user that lists media content events (or portions thereof) pertaining to the specified subcategory.

As another example, the user may select the general object type category of "people" on a first presented geographic playlist 116. Subcategories of people may include types, or even names, of people (actors, directors, publishers, celebrities, politicians, singers, musicians, athletes, historical figures, etc.). Once one or more subcategories are selected, one or more media content events (or portions thereof) that are associated with the selected subcategories, and that are within proximity to the determined geographic location of the mobile device 112, may be identified to generate geographic location playlist information.

In the various embodiments of the geographic location playlist generation system 100, it is appreciated that it is impractical to concurrently monitor geographic location information for all mobile devices 112 (since there are currently millions of mobile devices 112 in operation around the world at any given moment). An example embodiment limits the number of monitored mobile devices 112 by using a subscription-based service. Thus, a user may subscribe to a geographic location playlist generation service. Alternatively, or additionally, the user may have subscribed to a related service, such as by subscribing to content service provided by a particular content provider.

However, even a subscription-based service system may not have sufficient computational capacity and/or connective capacity so that all subscribers may be continuously monitored. Accordingly, some embodiments are configured to monitor geographic location information from selected mobile devices 112 and/or generate geographic location playlist information for selected users. Selection of mobile devices 112 may be made in a variety of manners.

An example embodiment requires a user to log into the geographic location playlist generation system 100 to initiate the monitoring process of selected mobile devices 112. For example, to select a mobile device 112 for monitoring, the user may be required to log into the geographic location playlist generation system 100 when they depart on a trip, vacation or the like. The monitoring process may be ended in response to the user again logging into the geographic location playlist generation system 100 to end the monitoring service. Alternatively, or additionally, the monitoring may end after cessation of movement of the mobile device 112 from some predefined duration, such as one or more hours or some predefined number of minutes.

Alternatively, or additionally, some embodiments may automatically select mobile devices 112 and initiate the monitoring of the geographic location information provided by mobile devices 112 after a current location of the mobile device exceeds some first predefined distance threshold away from a home location. For example, if the user's mobile device 112 indicates a location that has exceeded 1,000 kilometers, it is likely that the user is travelling on a trip, vacation or the like. Accordingly, monitoring and/or generating the geographic location playlist information may be automatically initiated. In some embodiments, the monitoring may end when the mobile device 112 returns to within some second predefined distance of the home location. The second predefined distance may be different from the first predefined distance. The home location may be based on account information of the subscribing user and/or may be specified by the user. Further, multiple home locations may be employed to initiate the monitoring and/or to end the monitoring.

In some embodiments, the monitoring may be implicitly initiated when the mobile device 112 is operated by the user. For example, the user may operate their mobile device 112 to select a category of interest. Here, it is implicitly appreciated that the monitoring process is to be initiated so that geographic location playlist information can be generated.

Alternatively, or additionally, the selecting and monitoring process may be initiated in response to a user request for presentation of a user geographic playlist 116. Here, geographic location information is communicated from the mobile device 112 in response to the user request. Then, the current location of the mobile device 112 is determined, and the geographic location playlist information is then generated based on the determined current geographic location of the mobile device 112.

Alternatively, or additionally, the selecting and monitoring process may be initiated in response to a user operating their mobile device 112 for another purpose. For example, the user may operate the tablet 112*a* or the smart phone 112*b* to make a telephone call to another party or to use at least one application residing on the tablet 112*a* or the smart phone 112*b*. Here, the current location of the mobile device 112 is determined in response to the use of the mobile device 112, and the geographic location playlist information is then generated based on the determined current geographic location.

Alternatively, or additionally, the selecting and monitoring process may be initiated periodically. Here, the current location of the mobile device 112 is determined at predefined periodic times, such as one an hour, day or the like. The geographic location playlist information is then generated based on the determined current geographic location of the mobile device 112. This determined geographic location playlist information may be pushed to the user's mobile device 112, and may then be stored until a user request for presentation of a user geographic playlist 116 is received.

In some embodiments, once the geographic location playlist information has been generated, a notification is communicated to the user's mobile device 112. The notification indicates the availability of the geographic location playlist information. If the user responds and indicates that they wish to view the corresponding user geographic playlist 116, then the geographic location playlist information is used to generate a presented user geographic playlist 116. If no response is received, or if the user indicates that they do not want to see the user geographic playlist 116, then no further actions are taken (at least until a later date).

In some situations, a plurality of different users may be associated with a single mobile device 112. Further, each different user may have different preferences and/or interests from other users. Accordingly, an example embodiment generates a plurality of different user geographic playlist information based on the identities, preferences and/or interests of each user. The user identity or identifier may be included in the received geographic location information that is provided by the mobile device 112. When the user identifies themselves via the mobile device 112 to the geographic location playlist device 104, the user geographic playlist information associated with that particular identified user is used to generate the geographic playlist information and present the user geographic playlist 116 for that particular user.

Alternatively, a single user geographic playlist information file may be generated based on the determined geographic location of the mobile device 112. The user geographic playlist information file also includes the categories that have been associated with the media content events (or portions thereof). When a request is made for presentation of a user geographic playlist 116, the user also provides their identity information. The mobile device 112 includes a list of user categories that have been associated with particular users and/or user identifiers. Accordingly, the user geographic playlist 116 is generated and presented based on filtering using user category identifiers that have been previously associated with that particular user. In such embodiments, the database 400 may include a list of user identifiers, and may include a list of category identifiers that have been associated with the user identifier. The categories may be defined based on the user's identity, preferences and/or interests. The user identifier may be an identifier of the user, such as their name, account number, password or the like. The user identifier may also be the identifier of the mobile device 112.

Alternatively, a list of user identities and a list of user category identifiers that have been defined based on the user's preferences and/or interests may be locally stored at the mobile device 112 and/or at the media device 102. The mobile device receives geographic playlist information that also includes categories associated with each of the media content events (or portions thereof). Since the list of user categories is stored at the mobile device 112, the processor system of the media device can compare the stored user categories with the categories in the geographic playlist information so that the user geographic playlist 116 is presented based on the user categories for that particular user.

Figure 7:
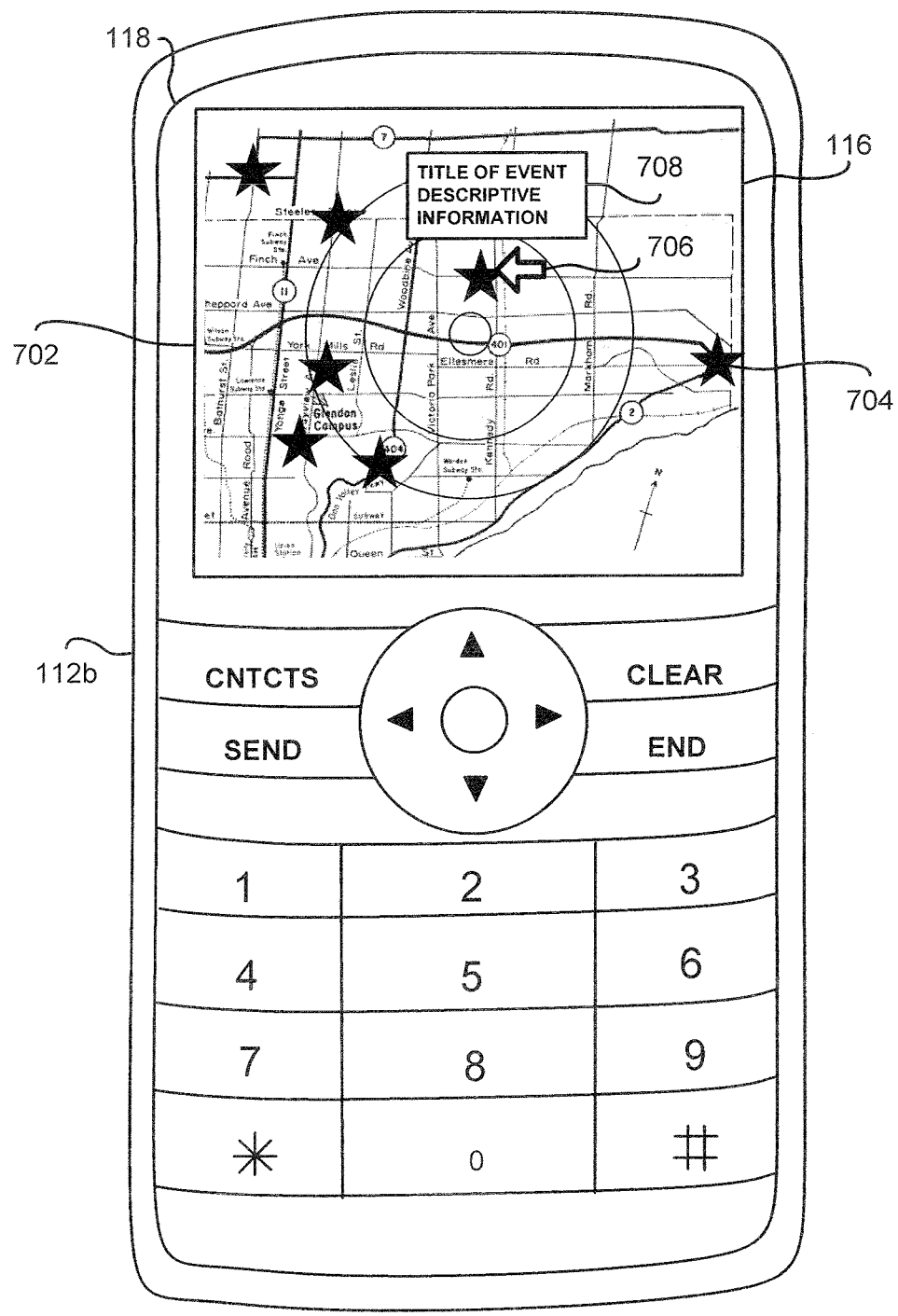
FIG. 7 is an example user geographic playlist presented as a map with indicating icons associated with media content events of interest.

FIG. 7 is an example user geographic playlist 116 presented as a map 702 with indicating icons 704 associated with media content events of interest. Here, a street map or satellite image centered about the current determined location of the mobile device 112, such as the example smart phone 112*b*, is presented on the display 118. Icons 704 related to identified media content events that may be of interest are shown on the map 702. The icons 704 are shown in proximity to the related geographic location information pertaining to that particular media content event. The current location of and/or distances from the mobile device 112 may be shown on the map 702, such as by a series of centric circles or the like.

In some embodiments, the user may expand or collapse the geographic coverage of the map 702. Further, filtering based on categories or the like may be used so that presented icons 704 identify media content event.

In some embodiments, the reference center location may be moved by the user. For example, the user may adjust the position of the presented map area such that different regions of the map are presented. Icons 704 in the currently presented map region may then be shown. Alternatively, or additionally, the user may specify some known location of interest or identify a point of interest, such as a city, address, landmark or the like. The presented region may then be centered about the user specified location or point of interest.

A pointer 706 may be maneuvered about the presented map 702 such that when the pointer hovers above or near a particular icon 704, a pop-up window 708 is presented. The pop-up window may indicate additional information about the media content event that is associated (such as, but not limited to, a scheduled broadcast time of the media content event, an indication of whether the media content event is available on demand, and/or whether the media content event can be accessed for free or for a fee). Selection of the icon 704 may cause presentation and/or storage of the associated media content event.

An icon 704 can be of fixed shape and/or size. Additionally, an icon 704 can depict an arbitrarily shaped area with a distinctive pattern, color, and/or boundary that corresponds to the actual size of the weather-related phenomenon. Any suitable icon fill color, pattern, and/or brightness/intensity may be used. The shape and or fill of the icon 704 may intuitively inform the user about one or more characteristics pertaining to the associated media content event.

It should be emphasized that the above-described embodiments of the geographic location playlist generation system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method performed at a geographic location playlist device, comprising:
   receiving location information from a mobile device that is communicatively coupled to the geographic location playlist device;
   identifying, based on the received location information, at least one of a plurality of media content events that has at least one associated geographic location that is within a predefined distance threshold from the received location information;
   determining, at the geographic location playlist device, an identifier of at least one of the plurality of media content events that is available for viewing to a user of the mobile device, wherein the identifier is determined based on electronic program guide (EPG) information that defines a future broadcast schedule of media content events; and
   communicating geographic playlist information, including the identifier, to the mobile device.

2. The method of claim 1, further comprising:
   receiving, at the geographic location playlist device, a user specification from the mobile device, wherein the user specification corresponds to a selection of one of the media content events that is indicated on the presented geographic playlist;
   specifying travel directions from the current geographic location of the mobile device to the geographic location associated with the selected plurality of media content events.

3. The method of claim 1, wherein after the geographic playlist is communicated from the geographic location playlist device to the mobile device, the method further comprising:
   receiving, at the geographic location playlist device, a user specification from the mobile device, wherein the user specification corresponds to a selection of one of the media content events that is indicated on the presented geographic playlist;
   wherein at least a portion of the selected media content event is accessed from a content system,
   wherein at least the portion of the selected media content event is communicated to the mobile device and is presented to the user by the mobile device.

4. The method of claim 3, wherein the communicated portion of the selected media content event is associated with location information that is the same as the received location information.

5. The method of claim 1, wherein after the geographic playlist is communicated from the geographic location playlist device to the mobile device, the method further comprising:
   receiving, at the geographic location playlist device, a user specification from the mobile device, wherein the user specification corresponds to a selection of one of the media content events that is indicated on the presented geographic playlist,
   wherein at least a portion of the selected media content event is accessed from a remote content system,
   wherein at least the portion of the selected media content event is communicated to the media device and is stored by a digital video recorder (DVR) controlled by the media device for later presentation to the user.

6. The method of claim 5, wherein the communicated portion of the selected media content event is associated with location information that is the same as the received location information.

7. The method of claim 1, wherein after the geographic playlist is communicated to the mobile device, the method further comprising:
   receiving, at the geographic location playlist device, a user specification from the media device, wherein the user specification corresponds to a selection of one of the plurality of media content events that is indicated on the presented geographic playlist,
   wherein at least a portion of the selected media content event is received at the mobile device during its broadcast and is presented to the user by the mobile device.

8. The method of claim 7, wherein the broadcasting portion of the selected media content event is associated with location information that is the same as the received location information.

9. The method of claim 1, wherein after the geographic playlist is communicated from the geographic location playlist device to the mobile device, the method further comprising:
   receiving, at the geographic location playlist device, a user specification from the media device, wherein the user specification corresponds to a selection of one of the plurality of media content events that is indicated on the presented geographic playlist, wherein at least a portion of the selected media content event is received at the media device during its broadcast, and wherein the broadcasting portion of the first type of media content is stored by a digital video recorder (DVR) controlled by the media device for later presentation to the user.

10. The method of claim 9, wherein the communicated portion of the selected media content event is associated with location information that is the same as the received location information.

11. The method of claim 1, further comprising:

storing the geographic playlist information at the geographic location playlist device;

receiving, at the geographic location playlist device from one of the mobile device or the media device, a user request for the stored geographic playlist information; and communicating the stored geographic playlist information from the geographic location playlist device to the requesting one of the mobile device or a media device in response to receiving the user request.

12. A method performed at a geographic location playlist device, comprising:

receiving, at the geographic location playlist device, a user specification that specifies a media content category, wherein the category is one of a plurality of categories, each associated with a predefined category distance;

receiving location information from a mobile device that is communicatively coupled to the geographic location playlist device;

comparing the received location information with geographic location information residing in a database of media content playlist information, wherein each geographic location information defines a geographic location that is associated with at least one of a plurality of media content events;

identifying, based on the comparison of the received location information with the geographic locations, at least one of the plurality of media content events that has at least one associated geographic location that is within the predefined category distance of the specified media content category from the received location information;

determining, at the geographic location playlist device, an identifier of at least one of the plurality of media content events that is available for viewing to a user of the mobile device, wherein the identifier is determined based on electronic program guide (EPG) information that defines a future broadcast schedule of media content events; and communicating geographic playlist information, including the identifier, to the mobile device.

13. The method of claim 12, further comprising:

receiving, at the geographic location playlist device, a user specification from the mobile device, wherein the user specification corresponds to a selection of one of the plurality of media content events that is indicated on the presented geographic playlist;

specifying travel directions from the current geographic location of the mobile device to the geographic location associated with the selected one of the plurality of media content events.

14. The method of claim 12, wherein after the geographic playlist is communicated from the geographic location playlist device to the mobile device, the method further comprising:

receiving, at the geographic location playlist device, a user specification from the mobile device, wherein the user specification corresponds to a selection of one of the plurality of media content events that is indicated on the presented geographic playlist;

wherein at least a portion of the selected media content event is accessed from a content system, wherein at least the portion of the selected media content event is communicated to the mobile device and is presented to the user by the mobile device.

15. The method of claim 12, wherein after the geographic playlist is communicated from the geographic location playlist device to the mobile device, the method further comprising:

receiving, at the geographic location playlist device, a user specification from the mobile device, wherein the user specification corresponds to a selection of one of the plurality of media content events that is indicated on the presented geographic playlist, wherein at least a portion of the selected media content event is accessed from a remote content system, wherein at least the portion of the selected media content event is communicated to the media device and is stored by a digital video recorder (DVR) controlled by the media device for later presentation to the user.

16. The method of claim 12, wherein after the geographic playlist is communicated to the mobile device, the method further comprising:

receiving, at the geographic location playlist device, a user specification from the media device, wherein the user specification corresponds to a selection of one of the media content events that is indicated on the presented geographic playlist, wherein at least a portion of the selected media content event is received at the mobile device during its broadcast and is presented to the user by the mobile device.

17. The method of claim 12, wherein after the geographic playlist is communicated from the geographic location playlist device to the mobile device, the method further comprising:

receiving, at the geographic location playlist device, a user specification from the media device, wherein the user specification corresponds to a selection of one of the plurality of media content events that is indicated on the presented geographic playlist, wherein at least a portion of the selected media content event is received at the media device during its broadcast, and wherein the broadcasting portion of the media content is stored by a digital video recorder (DVR) controlled by the media device for later presentation to the user.

18. A geographic location playlist device, comprising:

a communications network interface configured to:

communicatively couple the geographic location playlist device to a plurality of mobile devices via a communication system, and receive, from a mobile device that is currently communicatively coupled to the communications network interface, geographic location information associated with a current location of the mobile device;

a memory, wherein the memory stores a database of geographic playlist information including electronic program guide (EPG) information that defines a future broadcast schedule of a plurality of media content events, wherein each of the plurality of media content events are a movie or a serial program that are defined by a plurality of segments, wherein the database of geographic playlist information includes at least a unique identifier for each segment, and wherein the database of geographic playlist information includes at least one associated geographic location that is associated with each segment; and a processor system communicatively coupled to the memory and the communications network interface, wherein the processor system is configured to:

determine a current geographic location of the mobile device based on the received geographic location information;

identify, based on the current geographic location of the mobile device, at least one of the segments having its associated geographic location that is within a predefined distance threshold from the current geographic location of the respective mobile device, and generate user geographic playlist information, wherein the user geographic playlist information includes the identifier of the segment.

19. The device of claim 18, wherein the processor system is further configured to specify travel directions from the current geographic location of the mobile device to the geographic location associated with a selected one of the segments.

20. The device of claim 18, wherein the processor system is further configured to:

store the generated geographic playlist information at the geographic location playlist device;

receive, at the geographic location playlist device from the mobile device, a user request for the stored geographic playlist information; and communicate the stored geographic playlist information from the geographic location playlist device to the requesting mobile device in response to receiving the user request.

* * * * *